United States Patent
Kauffman et al.

(10) Patent No.: US 9,016,641 B1
(45) Date of Patent: Apr. 28, 2015

(54) APPLIANCE BRACKET

(71) Applicants: Jon Kauffman, Elkhart, IN (US); Barry Ousley, Syracuse, IN (US)

(72) Inventors: Jon Kauffman, Elkhart, IN (US); Barry Ousley, Syracuse, IN (US)

(73) Assignee: MOR/ryde International, Inc., Elkhart, IN (US)

( * ) Notice: Subject to any disclaimer, the term of this patent is extended or adjusted under 35 U.S.C. 154(b) by 127 days.

(21) Appl. No.: 13/866,663

(22) Filed: Apr. 19, 2013

(51) Int. Cl.
*F16M 13/02* (2006.01)

(52) U.S. Cl.
CPC ............ *F16M 13/02* (2013.01); *F16M 2200/00* (2013.01); *F16M 2200/021* (2013.01); *F16M 2200/024* (2013.01)

(58) Field of Classification Search
CPC .............. F16M 13/02; F16M 2200/00; F16M 2200/022; F16M 2200/024
See application file for complete search history.

(56) References Cited

U.S. PATENT DOCUMENTS

| | | | |
|---|---|---|---|
| 7,641,163 B2* | 1/2010 | O'Keene | 248/292.14 |
| 7,726,617 B2* | 6/2010 | Zambelli et al. | 248/288.31 |
| 2005/0263659 A1* | 12/2005 | Pfister et al. | 248/289.11 |
| 2007/0170336 A1* | 7/2007 | Li | 248/324 |
| 2007/0176067 A1* | 8/2007 | Monaco | 248/284.1 |

* cited by examiner

*Primary Examiner* — Amy Sterling
(74) *Attorney, Agent, or Firm* — Botkin & Hall, LLP

(57) ABSTRACT

A bracket having a base having a mounting plate with upstanding flanges on opposite sides. The flanges each include an upper notch and a lower notch oppositely located therefrom. The lower notches are adapted for receiving a second member. An adapter has a second mounting plate and upstanding flanges extending from opposite sides of the second mounting plate. The flanges carry the first and second members. The first member is biased laterally by a spring to a fully outward position. The first member is movable between the fully outward position and an inward position. The second member is fixed laterally with respect to the flanges on the adapter. The upper and lower notches are positioned so their respective openings are closer than the outermost portions of the first and second members when the first member is in its fully outward position.

11 Claims, 9 Drawing Sheets

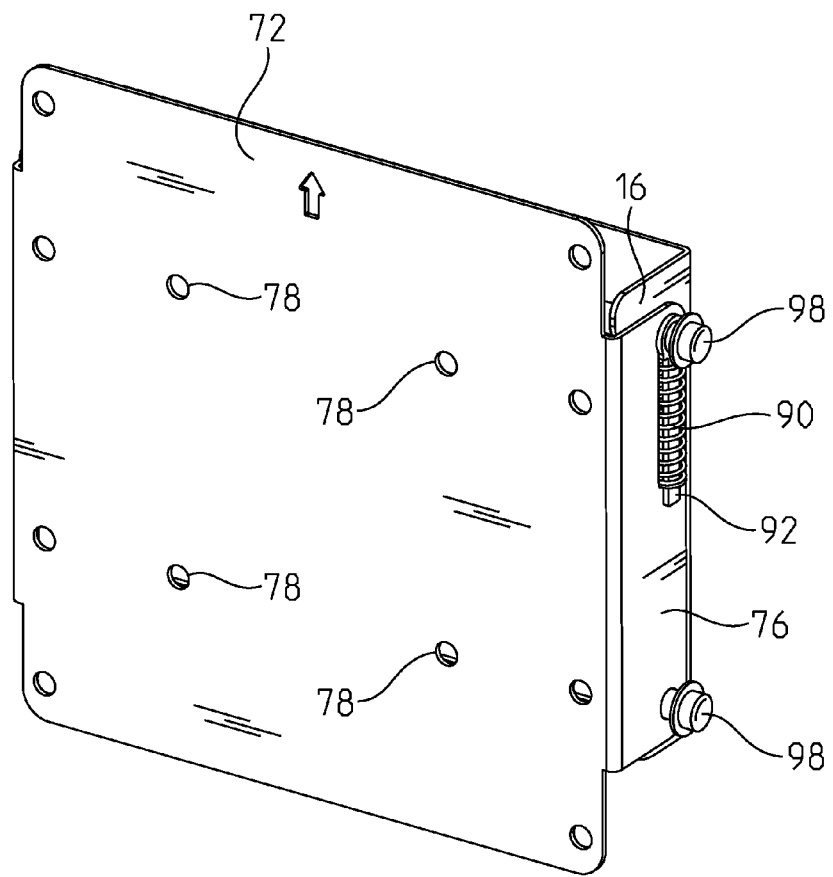
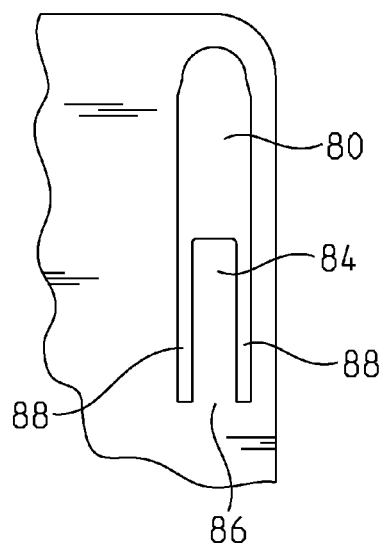
Fig. 4
Fig. 5A

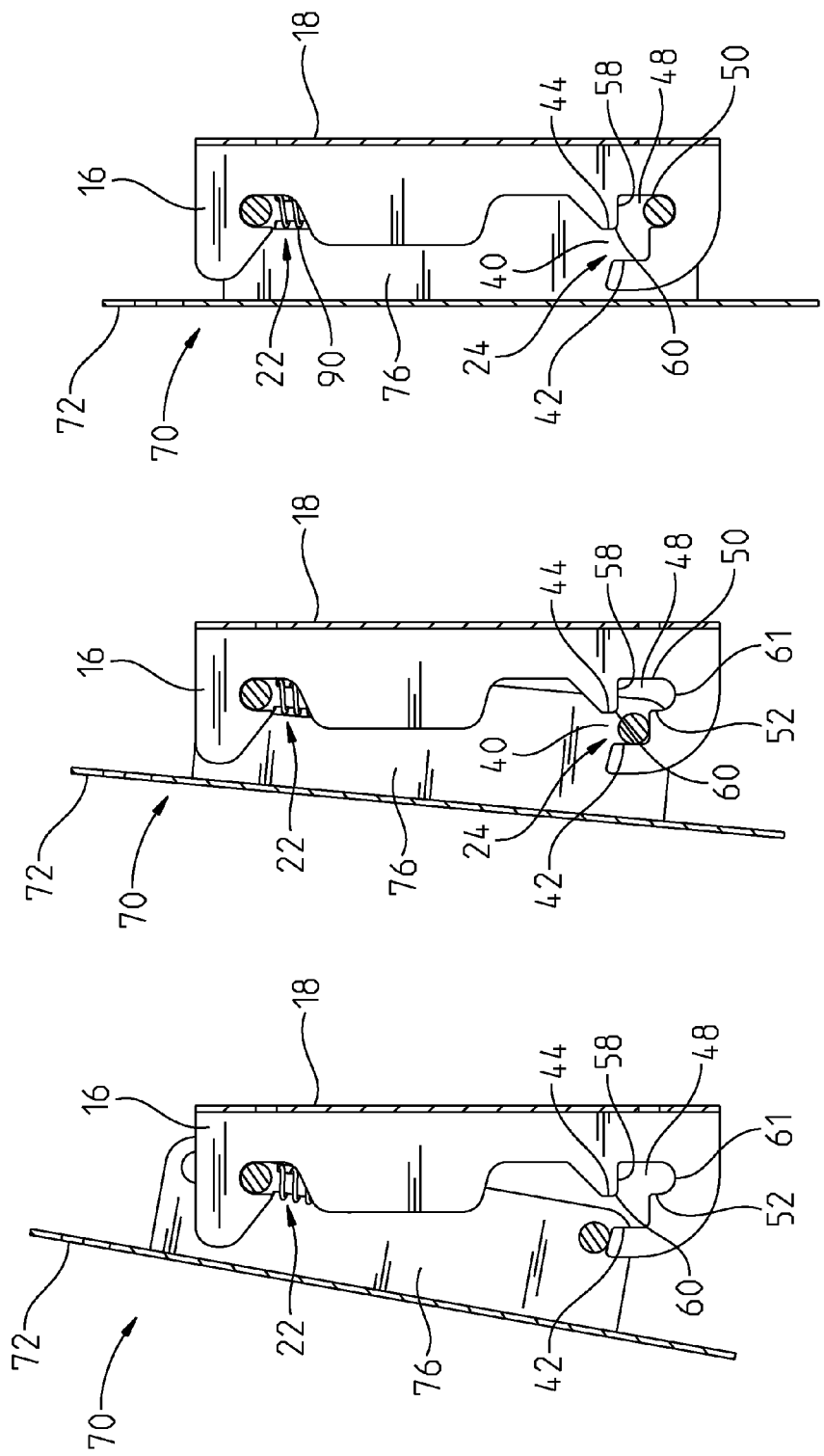

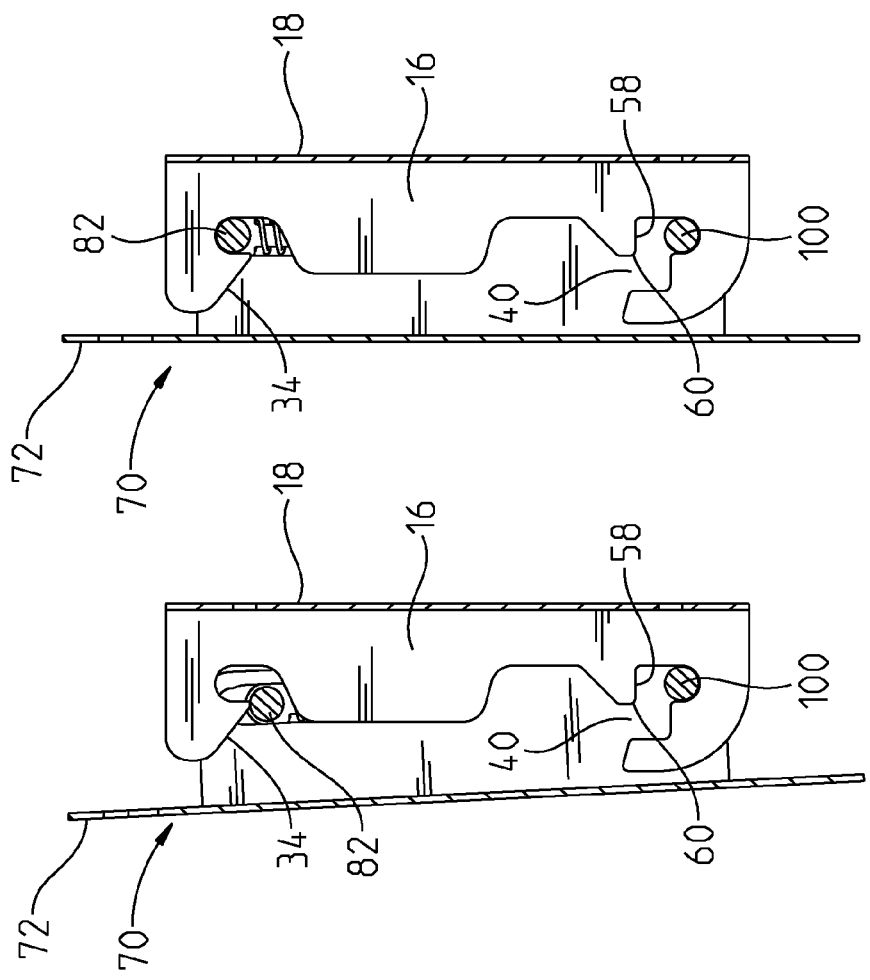
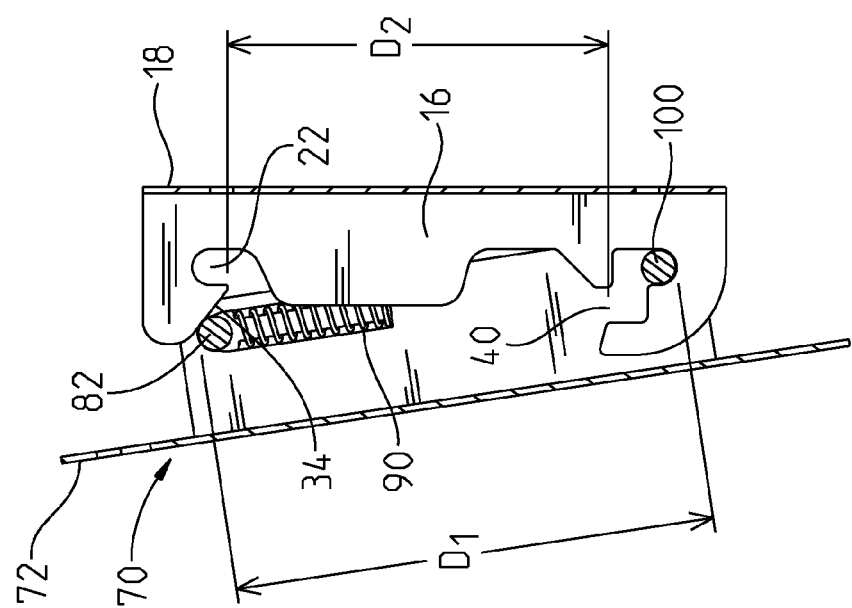

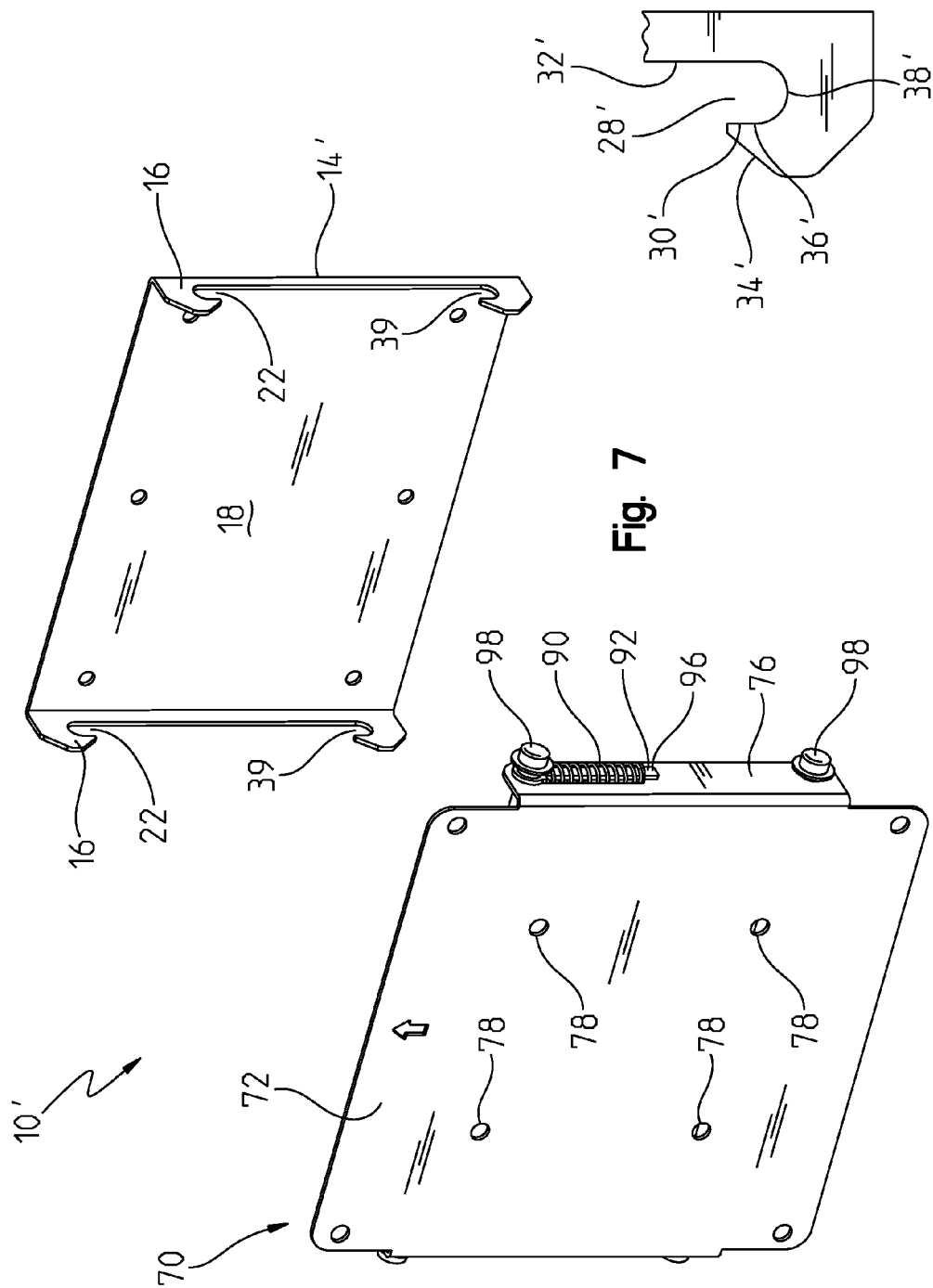

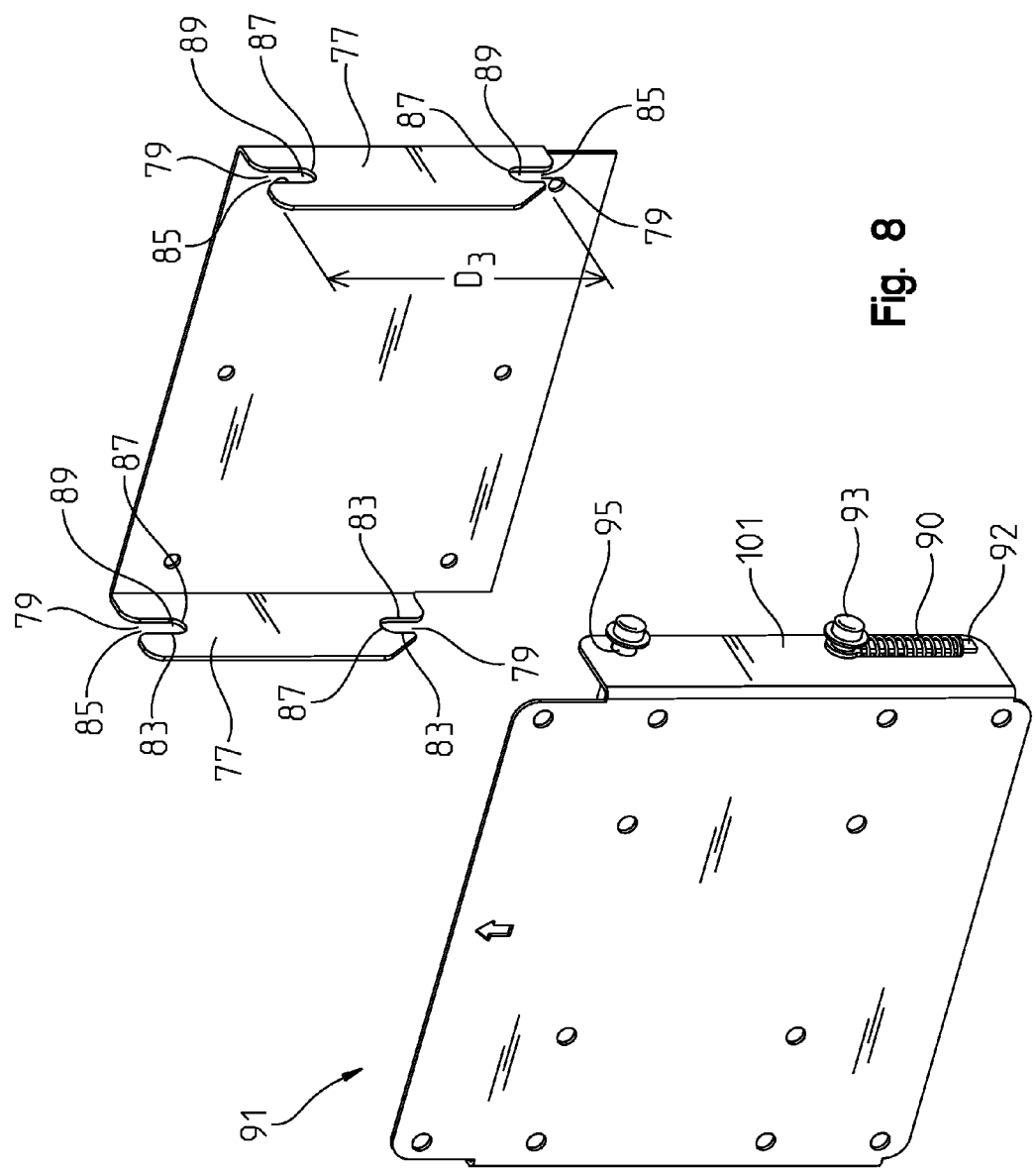

US 9,016,641 B1

APPLIANCE BRACKET

BACKGROUND OF THE INVENTION

Mounting a flat panel television to a wall is often cumbersome due to awkward mounting hardware. There are presently many types of mounting brackets that can affix a television directly to a wall, however these often have a rather thick profile that offsets the television significantly from the wall because of the hardware between the television and the wall. Ideally, the profile of the mounting hardware would be relatively thin. One of the difficulties in making the mounting hardware thin is the fact that screws have to be driven both into the wall that will hold the television and into the television itself. Swing arm style mounts allow access to both, but large awkward pieces must be held against the wall during the process. There is a need for a more simple flat panel television mounting system.

SUMMARY OF THE INVENTION

The bracket of the present invention has a base that has a mounting plate that has upstanding flanges on opposite sides of the mounting plate. The flanges extend from the mounting plate. Each of the flanges include an upper notch that has an opening defined by opposite sides. The openings continue into a recessed portion that has a terminal end. The upper notches are adapted to receive a first member. Each of the flanges include a lower notch oppositely located from the upper notch and having an opening defined by opposite sides. The opening of the lower notch continues into a recessed portion that has a terminal end. The lower notches are adapted for receiving a second member.

An adapter has a second mounting plate and upstanding flanges that extend from opposite sides of the second mounting plate. The upstanding flanges carry the first member that extends between the flanges. The first member is biased laterally by a spring to a fully outward position. The first member is movable between the fully outward position and an inward position. The second member extends between opposite flanges and is located oppositely of the first member. The second member is fixed laterally with respect to the flanges on the adapter. The upper and lower notches are positioned so their respective openings are closer than the outermost portions of the first and second members when the first member is in its fully outward position.

BRIEF DESCRIPTION OF THE DRAWINGS

FIG. 4 is a perspective view of the bracket shown in FIG. 3 with the adapter fully installed onto the base;

FIG. 5A is a magnified view of the finger and slot;

FIG. 6A is a side view of the bracket shown in FIG. 5 with the first rod in the upper notch with the first rod being in its laterally inward position;

FIG. 6B is a side view of the bracket shown in FIG. 6A with the second rod inserted into the opening of the lower notch before reaching the offset portion;

FIG. 6C is a side view of the adapter being installed on the base;

FIG. 6D is a side view of the bracket shown in FIG. 5 with the second rod in the lower notch;

FIG. 6E is a side view of the bracket shown in FIG. 6D with the first rod in its laterally inward position;

FIG. 6F is a side view of the bracket shown in FIG. 6E with the adapter installed onto the base;

FIG. 7 a perspective view of another embodiment of the bracket;

FIG. 7A is a magnified view of the lower notch.

FIG. 8 is an exploded perspective view of an embodiment having outwardly facing notches.

DETAILED DESCRIPTION OF INVENTION

Figure 1:
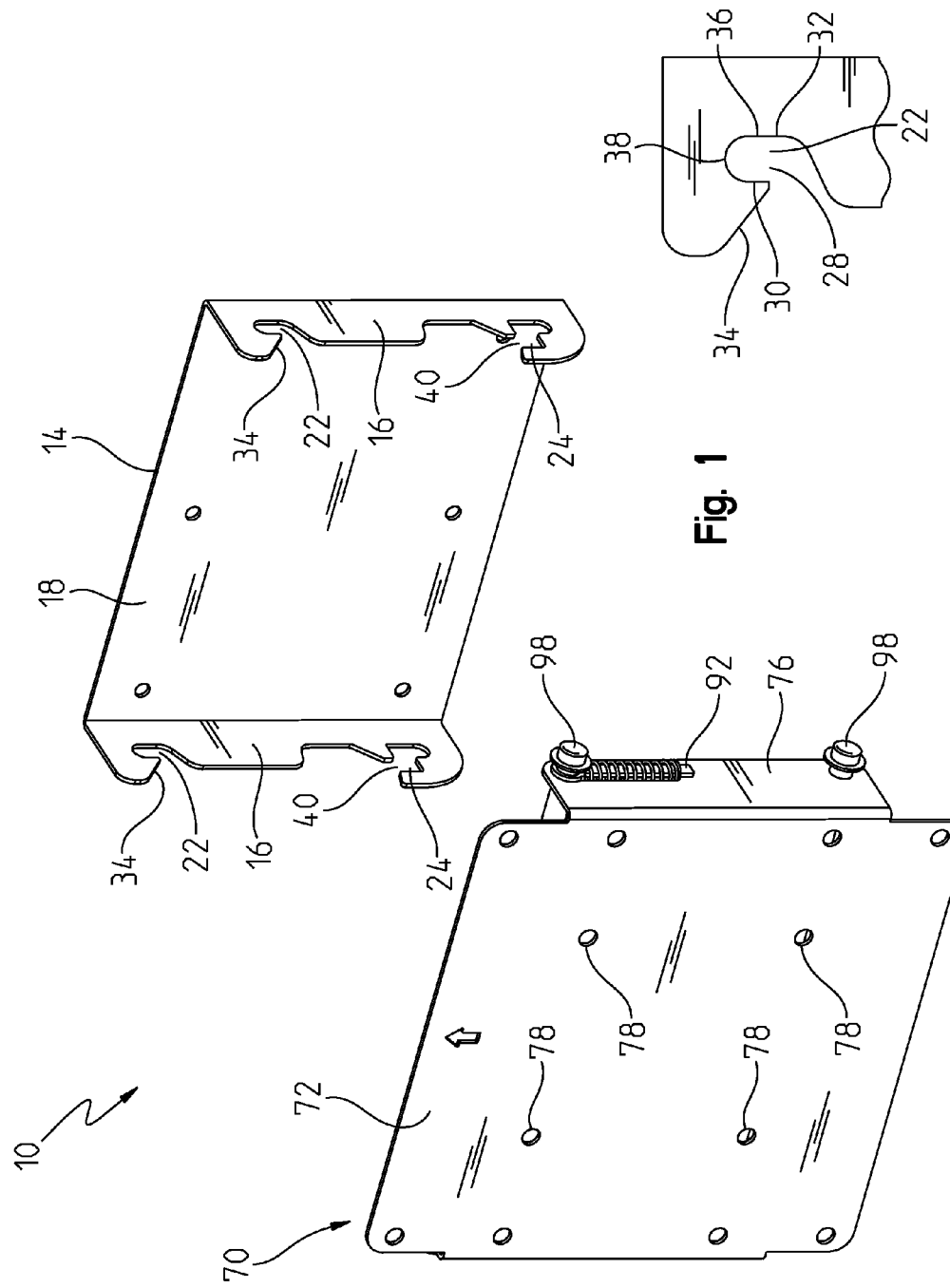
FIG. 1 is a perspective view of an embodiment of the bracket having offset lower notches.

FIG. 1 shows perspective view of the appliance bracket 10 of the invention and FIG. 7 shows a perspective view of another embodiment of the appliance bracket 10'. Each bracket 10, 10' has a base 14, 14'. The base 14 has a pair of upstanding flanges 16 on opposite sides of a mounting plate 18. The mounting plate 18 and flanges 16 are formed from a continuous piece of metal with the flanges 16 being bent perpendicularly with respect to the mounting plate 18. Each flange includes an upper notch 22 and a lower notch 24, 39. The upper notches 22 and lower notches 24, 39 are directly across from each other on the flanges 16. The lower notch 24 shown in FIGS. 1-6F is a different configuration than that of notch 39 shown in FIG. 7. The differences between notches 24 and 39 will be discussed below.

Figure 1A:
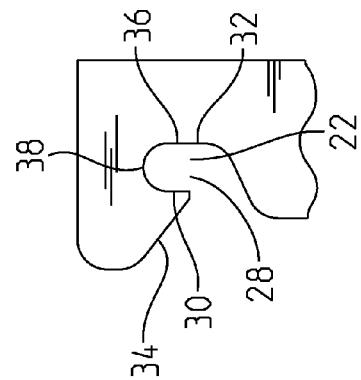
FIG. 1A is a magnified view of the upper notch.
Figure 3:
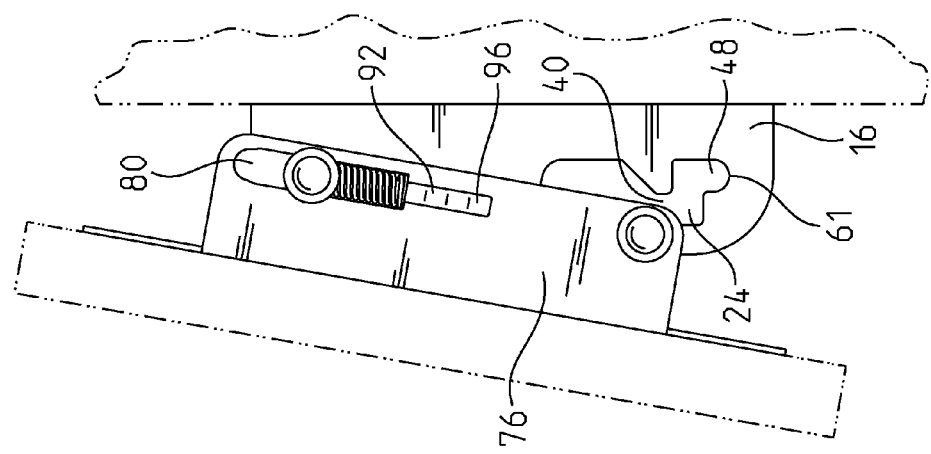
FIG. 3 is a side view of the bracket shown in FIG. 2.
Figure 2:
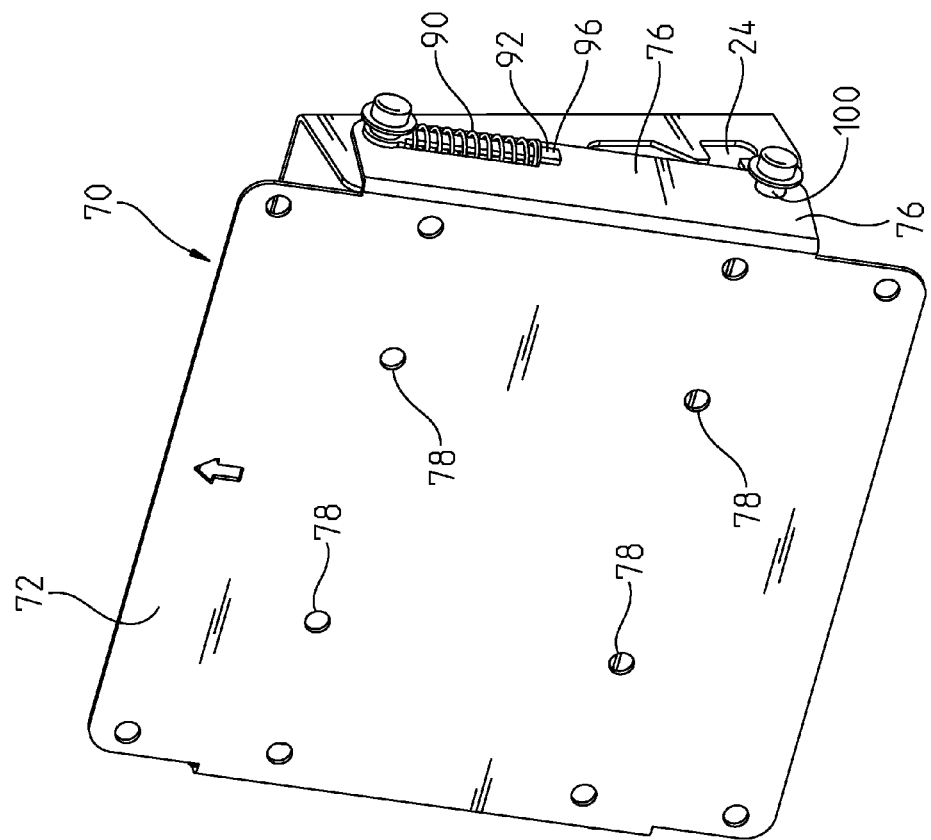
FIG. 2 is a perspective view of the embodiment shown in FIG. 1, with the adapter being installed into the base.

Each upper notch 22 has an opening 28. The upper notch 22 is shown in detail in FIG. 1A. The upper notch 22 has an outer side 30 being farther from the mounting plate 18 and an inner side 32 that is nearer the mounting plate 18. The outer side 30 and inner side 32 define the width of the opening 28. Adjacent to the opening 28 on the outer side 30 is a chamfer 34 that terminates at the opening 28. Each opening continues into a recessed portion 36 behind the opening 28. The recessed portion 36 terminates in a round terminal end 38. In the case of the upper notches 22, the recessed portion 36 is aligned with the opening and the notches 22 are the same width for their entire length. Thus, notches 22 are simply slots. In the embodiment shown in FIG. 7, lower notches 39 are the same as upper notches 22. The lower notches 39 have all of the same parts including opening 28', inner side 32', outer side 30', chamfer 34', recessed portion 36', terminal end 38' as shown in FIG. 7B, and are located in mirror opposite positions to upper notches 22.

The lower notches 24 shown in FIGS. 1-6F are not simple slots. Notch 24 has an opening 40 that is spaced from the mounting plate 18 in each flange 16. The openings 40 have opposite sides 42, 44. The opposite sides 42, 44 define the width of the openings 40. The opening 40 of each notch 24 is connected to an offset recessed portion 48. The recessed portion 48 is offset from being aligned with the opening 40 approximately a distance equal to the width of the opening 40. The recessed portion has an opposite inner side 50 nearer the mounting plate 18 and an outer side 52 that is farther from the mounting plate 18. The sides 50, 52 define the width of the recessed portion 48. The recessed portion 48 is located so that the entire width of the recessed portion is blocked by a wall 58. No part of the recessed portion 48 is further from the mounting plate 18 than the terminal end 61 of wall 58. No part of the recessed portion 48 is aligned with the opening 40. The length of the wall 58 from the inner side 50 to the terminal end 60 of the wall 58 is at a minimum as wide as the recessed portion 48 and may be larger than the width of the recessed portion 48. The terminal end 60 is the corner where opening meets the wall 58.

Figure 5:
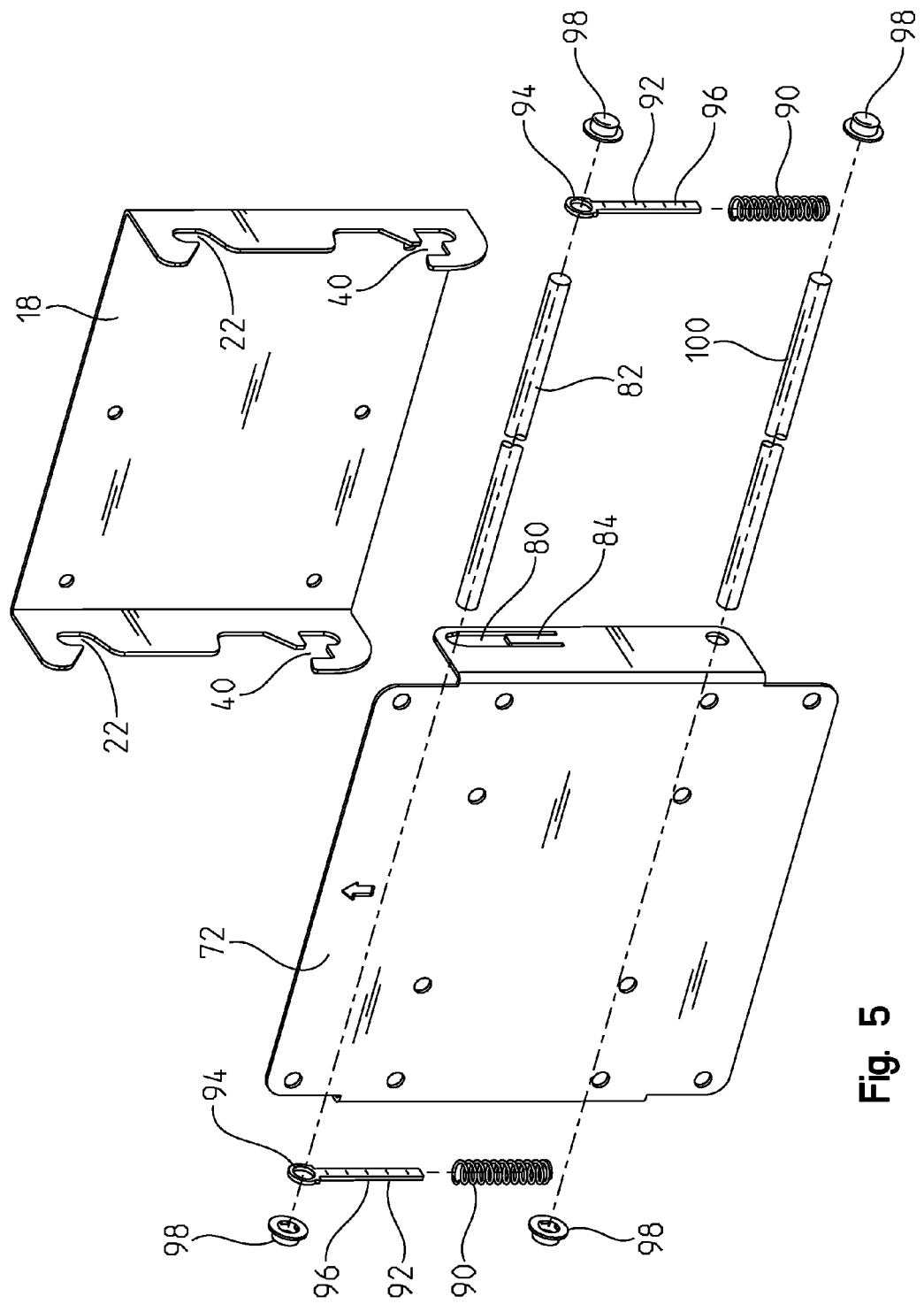
FIG. 5 is an exploded perspective view of the bracket shown in FIG. 4.

The bracket 10, 10' has an adapter 70 that has a second mounting plate 72. The second mounting plate 72 has upstanding flanges 76 on opposite sides. The adapter 70 is designed to be mounted to an appliance that will be mounted to a wall. The bracket 10, 10' is particularly useful for mounting flat panel televisions to walls. As can be seen in FIGS. 1 and 7, the adapter 70 has a hole pattern that may be used with standard screw hole 78 patterns in flat panel televisions. The holes 78 can be located to accommodate any desired pattern that will fit the appliance being affixed to the adapter 70. The adapter 70 works equally well with both embodiments 10, and 10' of the invention. Each flange 76 on the adapter 70 has opposing slots 80 shown in FIG. 5 that are for receiving a first rod 82. The slots 80 as seen in FIG. 5 each have a finger 84 at their bottom. The finger 84 is attached at its lower end 86 as seen in FIG. 5A and has peripheral slots 88 on both sides so that each finger 84 is cantilevered from its respective flange 76.

A coil spring 90 is placed around each finger 84. The coils of the coil springs 90 are of a diameter to locate the springs 90 around a corresponding finger 84 and have the coils held within the peripheral slots 88. The slots 80 have enough length so that the springs 90 may be inserted into the slots and over the fingers 84. The fingers 84 have a tendency to keep the springs 90 placed around them aligned with their respective flanges 76. However, a spring guide 92 provides additional assurance that the springs 90 will remain aligned with the flanges 76. The spring guides 92 have a ring 94 that fits over the first rod 82 and a tab 96 that is approximately the same width as the fingers 84. During installation, the springs 90 are first placed on the fingers 84. Then, the tabs 96 are placed inside the coils of the springs 90. With the tabs 96 in place within the springs 90, the first rod 82 is placed within the rings 94 of the guides 92 and end caps 98 are installed on the ends of rod 82. The end caps 98 prevent longitudinal movement of the first rod 82. The guides 92 cooperate with the rod 82 and fingers 84 to capture the springs 90. The rod 82 has a fully outward position that is shown in FIG. 7 and is movable into an inward position shown in FIG. 6E. The springs 90 bias the rod 82 laterally into its fully outward position shown in FIG. 7.

A second rod 100 is carried within the flanges 76 opposite to the first rod 82. The second rod 100 is fixed within the flanges 76 and does not move with respect to the flanges 76. The second rod 100 is held within the flanges with end caps 98 that fix it from longitudinal movement. The first and second rod 82, 100 are a fixed distance apart when the first rod 82 is in its fully outward position shown in FIG. 6D. Both of the rods 82, 100 are round and their outermost portions laterally are at their maximum distance apart when the first rod 82 is in its fully outward position. A first distance, D1 in FIG. 6D, shows this distance between the outermost portions of the rods 82, 100.

The openings of the upper notches 22 and lower notches 24, 39 are at fixed distances apart. The distance between the upper notch openings 28 and lower notch openings 40, 28' are at a second distance D2. D2 is shown in FIG. 6D. The second distance D2 between the openings 28 and 40, 28' is less than the first distance D1 between the outermost portions of the rods 82, 100 when the first rod 82 is in its outermost position shown in FIG. 6D. Due to the fact that D1 is greater than D2 at the openings, the first rod 82 must move inwardly so that the rods 82, 100 can both be placed in corresponding notches 22 and 24, 39. D2 is the same for the embodiment shown in FIG. 1 and that shown in FIG. 7. In either of the aforementioned embodiments, it is contemplated that the rods 82, 100 may both be biased with springs. However, it is simpler to bias only one of the rods 82, 100.

Figure 8A:
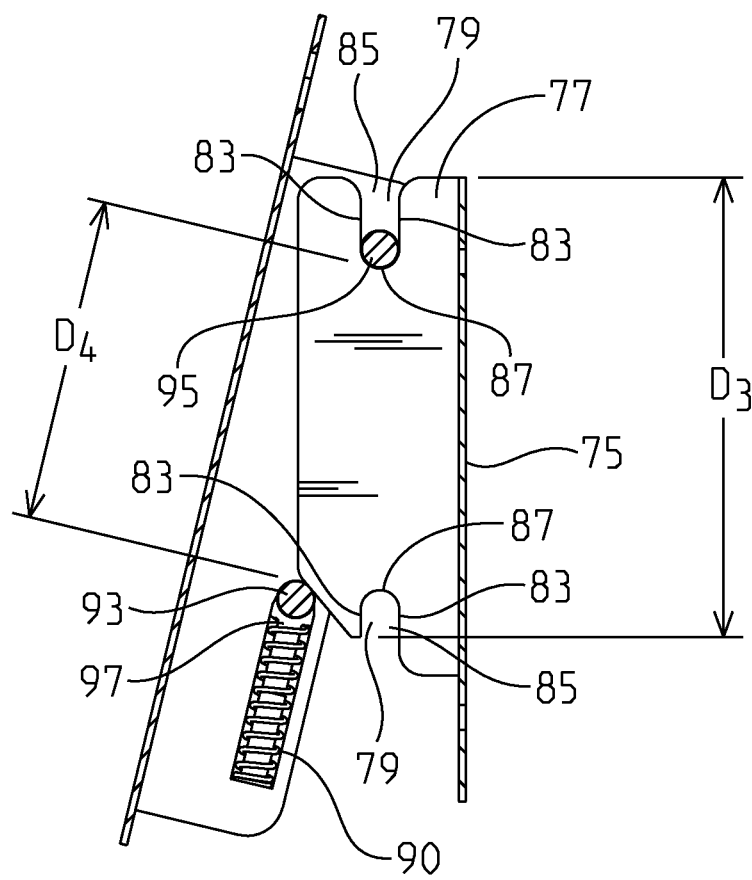
FIG. 8A is a side view of the embodiment shown in FIG. 8.

Another embodiment is shown in FIGS. 8 and 8A. This embodiment has a base 75, having flanges 77 that include has notches 79. Unlike the previous embodiment, the notches 79 face outwardly. Each notch 79 has opposite sides 83 that define openings 85. Each notch 79 has a terminal end 87. The openings 85 are set apart at a distance D3 and recessed portions 89 are located inwardly of the openings 85. An adapter 91 has a first rod 93 and a second rod 95. The adapter 91 is built much like the adapter 70 mentioned above. The first rod 93 rides in slots 97 in flanges 101 and is laterally biased by coil springs 90. Like adapter 70, this adapter 91 has guides 92 and fingers 84 to retain the springs 90 at opposite ends of the first rod 93. The innermost portion of the rods 93, 95 are at a minimum lateral distance part D4. D4 corresponds to the innermost position of the first rod 93. Each flange 77 includes a chamfer 99 that may be used to push the first rod 93 inwardly until the first and second rod 93, 95 are aligned with the openings. At such time the rods 93, 95 are aligned with the notches 79, the springs 90 on the first rod 93 will bias both rods 93, 95 inwardly into their corresponding notches. It is contemplated that springs may be used to bias both rods 93, 95 laterally, however, the design shown in FIGS. 8, 8A is effective.

FIGS. 6D-6F show how the rods 82, 100 are placed within notches 22, 24. Often times the appliance bracket 10 will be used with a flat panel television and for illustrative purposes of the bracket 10 itself the television is not shown attached to the adapter 70. As can be understood the weight of a television attached to the adapter 70 can be considerable and often a user of the bracket 10 will wish to first place the second rod 100 into the lower notch 24 to support the weight of the television. FIG. 6D shows how a user would use the second rod 100 to support the weight of the television by placing the second rod 100 into the lower notch 24 first. As can be seen in FIG. 6D, D1 is greater than the distance between openings D2 because the first rod 82 is in its outermost position. The user of the bracket 10 may then tip adapter 70 so the first rod 82 which is in the upper position, pushes against the chamfer 34 adjacent to the upper notch. As the adapter 70 is tipped toward the base 14, the first rod 82 will be pushed inwardly toward the second rod 100, moving the first rod 82 inwardly of its fully outward position. FIG. 6E shows rod 82 pushed inwardly of its fully outward position. With the rod 82 in this position, the first rod 82 may be aligned with opening 28. When the rod 82 is aligned with opening 28, the springs 90 will bias both rods 82, 100 into the notches 22, 24. The terminal ends 38, 61 are the same distance apart as the first distance D1 corresponding to the outermost distance between the rods 82, 100. In some instances it is desirable to have the terminal ends 38, 61 slightly closer than D1 (the outermost maximum distance between rods 82, 100) so the springs 90 provide a laterally biasing force that maintains a tight fit when the adapter 70 is installed on the base 14 as shown in FIG. 6C. Alternatively, the adapter 70 may be installed by pushing the first rod 82 into the upper notch 22 so that the rod 82 is pushed inwardly of its outermost position. This is shown in FIG. 6A. Once rod 82 is moved inwardly of its outermost position, the lower second rod 100 may be inserted into the lower notch 24 as shown in FIG. 6B. FIG. 6C shows the adapter 70 installed onto the base 14. In the embodiment shown in FIG. 7, the adapter 70 may be installed upon the base 14' in the same way as shown in FIGS. 6A-6C or 6D-6F. Both rods 82, 100 being round assists in the functioning of the bracket 10, 10' because of the rods' 82, 100 complementary shape with respect to the recessed portions 36, 36', 48 allows the adapter 70 to be easily tilted into place. The round shape also allows the chamfer 34 to push the first rod 82 into its inward position. The installation procedure described above may be used with the design shown in FIGS. 8 and 8A.

The bracket 10 embodiment shown in FIGS. 6A-6F is particularly useful for use in a recreational vehicle. The lower notch 24 prevents movement of the adapter 70 from the base 14 when going over bumps in the road from dislodging the rods 82, 100. This is because the wall 58 acts as a stop that prevents the second rod 100 from moving upward and potentially out of the lower notch 24.

The present invention is not limited to the details given above, but may be modified within the scope of the following claims.

What is claimed is:

1. A bracket comprising:
    a base having a mounting plate and upstanding flanges on opposite sides of said mounting plate extending from said mounting plate, each of said flanges including an upper notch having an opening defined by opposite sides, said opening continuing into a recessed portion having a terminal end, said upper notches being adapted for receiving a first member, each of said flanges including a lower notch oppositely located from said upper notch and having an opening defined by opposite sides, said opening continuing into a recessed portion having a terminal end, each said lower notch adapted for receiving a second member;
    an adapter having a second mounting plate and upstanding flanges on opposite sides of said second mounting plate, said upstanding flanges carrying said first member extending between said flanges, said first member being biased laterally by a spring to a fully outward position, said first member being movable between said fully outward position and an inward position, said second member extending between opposite flanges and located oppositely of said first member and being laterally fixed with respect to said flanges on said adapter, said upper and lower notches having their respective openings positioned to be closer than outermost portions of said first and second members when said first member is in its fully outward position.

2. The bracket as claimed in claim 1, wherein said recessed portion is offset from said opening.

3. The bracket as claimed in claim 1, wherein one of said notches includes a chamfer adjacent to said opening.

4. The bracket as claimed in claim 1, wherein said first member is a first rod having a spring within each flange on said adapter laterally biasing said first rod, said first rod riding in slots within said flanges.

5. The bracket as claimed in claim 4, wherein each said flange on said adapter includes a finger adjacent to each said slot, each said spring being a coil spring having coils, said fingers adapted for extending upwardly into said coils.

6. The bracket as claimed in claim 5, wherein a spring guide is mounted adjacent to an end of said first rod, said spring guide having a tab extending into coils of one of said springs and said guide being slidable adjacent to a corresponding finger.

7. The bracket as claimed in claim 5, wherein said fingers are aligned with said flanges on said adapter.

8. The bracket as claimed in claim 7, wherein a spring guide is mounted adjacent to an end of said first rod, said spring guide having a tab extending into coils of one of said springs and said guide being slidable adjacent to a corresponding finger.

9. The bracket as claimed in claim 1, wherein said recessed portion is offset from said opening, said opening having a width and said offset portion having a width, said offset portion being offset a distance from said opening so that no portion of said offset portion is aligned within said width of said opening.

10. A bracket comprising:
    a base having a mounting plate and upstanding flanges on opposite sides of said mounting plate extending from said mounting plate, one of said flanges including an upper notch having an opening defined by opposite sides, said opening continuing into a recessed portion having a terminal end, each said flange including a lower notch oppositely located from said upper notch and having an opening defined by opposite sides, said opening continuing into a recessed portion having a terminal end;
    an adapter having a second mounting plate and upstanding flanges on opposite sides of said second mounting plate, one of said upstanding flanges on said second mounting plate carrying a first member, and a second member spaced from said first member and carried by said one flange on said adapter, said first member riding in a slot in said one flange on said adapter and said first member being laterally biased with a spring within said slot, said spring biasing said first and second members into said notches when said first and second members are aligned with said openings of said upper and lower notches in said base.

11. The bracket as claimed in claim 10, wherein said first and second members span between opposite flanges on their corresponding mounting plate, each flange on said adapter includes a finger being substantially aligned with its corresponding flange to which it is attached and adjacent to each slot, each said finger having peripheral slots adjacent to each finger and said finger adapted for extending into a coil spring being placed on each said finger for biasing said first member into its said fully outward position.

* * * * *